(12) United States Patent
Machida et al.

(10) Patent No.: US 9,562,293 B2
(45) Date of Patent: Feb. 7, 2017

(54) POLYMERIZATION SOLUTION, CONDUCTIVE POLYMER FILM OBTAINED FROM THE POLYMERIZATION SOLUTION, POLYMER ELECTRODE, AND SOLID ELECTROLYTIC CAPACITOR

(75) Inventors: Kenji Machida, Tokyo (JP); Sekihiro Takeda, Tokyo (JP); Ryo Muroi, Tokyo (JP); Nozomu Kamiyama, Tokyo (JP); Masashi Ozawa, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 669 days.

(21) Appl. No.: 14/002,248

(22) PCT Filed: Mar. 1, 2012

(86) PCT No.: PCT/JP2012/055284
§ 371 (c)(1),
(2), (4) Date: Oct. 8, 2013

(87) PCT Pub. No.: WO2012/118161
PCT Pub. Date: Sep. 7, 2012

(65) Prior Publication Data
US 2014/0022701 A1  Jan. 23, 2014

(30) Foreign Application Priority Data

Mar. 1, 2011 (JP) ................................ 2011-044105
Mar. 1, 2011 (JP) ................................ 2011-044279

(51) Int. Cl.
*H01G 9/02* (2006.01)
*H01G 9/04* (2006.01)
(Continued)

(52) U.S. Cl.
CPC . *C25B 3/10* (2013.01); *C08K 5/43* (2013.01); *H01B 1/127* (2013.01); *H01G 9/0036* (2013.01);
(Continued)

(58) Field of Classification Search
CPC .......... H01G 9/15; H01G 9/012; H01G 9/042; H01G 9/025; H01G 9/0036; H01G 9/25; H01G 9/028
(Continued)

(56) References Cited

U.S. PATENT DOCUMENTS 4,910,645 A    3/1990 Jonas et al.
4,959,430 A    9/1990 Jonas et al.
(Continued)

FOREIGN PATENT DOCUMENTS

JP    1-313521 A    12/1989
JP    2-15611 A     1/1990
(Continued)

OTHER PUBLICATIONS

Abstracts of the Symposium of the Japan Society for Analytical Chemistry, 2008, vol. 69, partial English translation of last paragraph on p. 222.
(Continued)

*Primary Examiner* — Eric Thomas
*Assistant Examiner* — Arun Ramaswamy
(74) *Attorney, Agent, or Firm* — Birch, Stewart, Kolasch & Birch, LLP (57) ABSTRACT

Disclosed is a polymerization solution for electrolytic polymerization having a small environmental load, having excellent economic efficiency and capable of producing a conductive polymer exhibiting excellent heat resistance. The polymerization solution has: a solvent consisting of 100 to 80% by mass of water and 0 to 20% by mass of an organic (Continued)

(A)

(B)

solvent; at least one monomer selected from the group consisting of 3,4-disubstituted thiophenes; and at least one organic non-sulfonate supporting electrolyte having an anion with the molecular weight of 200 or more. A conductive polymer film densely filled with polymer particles is obtained by performing electrolytic polymerization using the polymerization solution. A polymer electrode provided with the conductive polymer film exerts excellent heat resistance and the electrochemical activity of the polymer electrode will hardly deteriorate even when being subjected to high temperatures. Moreover, a solid electrolyte capacitor containing the conductive polymer layer obtained by performing electrolytic polymerization using the polymerization solution exhibits low dielectric loss and equivalent series resistance and exerts excellent heat resistance.

16 Claims, 4 Drawing Sheets

(51) Int. Cl.
    H01G 9/145    (2006.01)
    H01G 9/00     (2006.01)
    C25B 3/00     (2006.01)
    C25B 3/10     (2006.01)
    H01G 9/028    (2006.01)
    H01G 9/15     (2006.01)
    C08K 5/43     (2006.01)
    H01B 1/12     (2006.01)
    H01G 9/042    (2006.01)

(52) U.S. Cl.
    CPC ............ *H01G 9/028* (2013.01); *H01G 9/042* (2013.01); *H01G 9/15* (2013.01); *C08G 2261/3223* (2013.01); *C08G 2261/51* (2013.01); *C08G 2261/592* (2013.01); *C08G 2261/94* (2013.01); *Y10T 428/31533* (2015.04)

(58) Field of Classification Search
    USPC .................................. 361/523, 525, 532, 528
    See application file for complete search history.

(56) References Cited

U.S. PATENT DOCUMENTS

2006/0236531 A1   10/2006   Merker et al.
2013/0037411 A1   2/2013    Atobe et al.

FOREIGN PATENT DOCUMENTS

| JP | 2-58818 A | 2/1990 |
| JP | 10-289839 A | 10/1998 |
| JP | 2000-269087 A | 9/2000 |
| JP | 2000-336154 A | 12/2000 |
| JP | 2005-259807 A | 9/2005 |
| JP | 2006-295184 A | 10/2006 |
| JP | 2009-295882 A | 12/2009 |
| JP | WO 2011/108254 A1 | 9/2011 |
| WO | WO 2011/108255 A1 | 9/2011 |

OTHER PUBLICATIONS

Asami et al., "Development of a novel environmentally friendly electropolymerization of water-insoluble monomers in aqueous electrolytes using acoustic emulsification," Langmuir, vol. 22, No. 24, Aug. 29, 2006, pp. 10258-10263.
Asami et al., "Electropolymerization of an immiscible monomer in aqueous electrolytes using acoustic emulsification," J. Am. Chem. Soc., vol. 127, No. 38, 2005, pp. 13160-13161.
Atobe et al., "Electrochemical reaction of water-insoluble organic droplets in aqueous electrolytes using acoustic emulsification," Langmuir article, vol. 26, No. 11, 2010, pp. 9111-9115.
Djellab et al., "Stabilization of the conductivity of poly(3-methylthiophene) by triflimide anions," Synthetic Metals, vol. 74, 1995, pp. 223-226.
Du et al., "Effects of polymerization potential on the properties of electrosynthesized PEDOT films," Electrochimica Acta, vol. 48, Feb. 6, 2003, pp. 1713-1717.
International Search Report (Form PCT/ISA/210) for International Application No. PCT/JP2012/055284, dated May 29, 2012.
Morvant et al., "In situ conductivity studies of poly(3,4-ethylenedioxythiophene)," Synthetic Metals, vol. 92, 1998, pp. 57-61.
Nakabayashi et al., "Transparentization of emulsified solution containing water-insoluble organic droplets using tandem.,.," Abstracts of Autumn Meeting of the Electrochemical Society of Japan, Sep. 2010, vol. 2010, partial English translation of description in right colomn on p. 15.
Tamburri et al., "Growth mechanisms, morphology, and electroactivity of PEDOT layers produced by electrochemical routes in aqueous medium," Synthetic Metals xxx, 2008, pp. 1-9.
Ye et al., "Preparation and properties of conducting polypyrrole doped with fluorinated imides," Synthetic Metals, vol. 60, No. 2, 1993, pp. 141-144.
Zhou et al., "Electrodeposited PEDOT films on ITO with a flower-like hierarchical structure," Synthetic Metals xxx, 2010, pp. 1-6.

POLYMERIZATION SOLUTION, CONDUCTIVE POLYMER FILM OBTAINED FROM THE POLYMERIZATION SOLUTION, POLYMER ELECTRODE, AND SOLID ELECTROLYTIC CAPACITOR

BACKGROUND OF THE INVENTION

1. Field of the Invention

The present invention relates to a polymerization solution having a small environmental load, having excellent economic efficiency and providing a conductive polymer exhibiting excellent heat resistance. The present invention also relates to a conductive polymer film, a polymer electrode and a solid electrolytic capacitor obtained from the polymerization solution.

2. Description of the Related Art

Conductive polymers delivered from thiophenes have been known in the prior art, and have been applied to a wide range of fields such as solid electrolytic capacitors, polymer batteries, antistatic films, indicating elements, sensors and electrode materials. Especially, the application of conductive polymers obtained from 3,4-disubstituted thiophenes including 3,4-ethylenedioxythiophene (hereinafter 3,4-ethylenedioxythiophene is referred to as "EDOT" and poly(3,4-ethylenedioxythiophene) is referred to as "PEDOT") has been frequently researched because these polymers have high conductivity and environmental durability.

These conductive polymers can be obtained by an electrolytic polymerization method or a chemical polymerization method (for example, see Patent Document 1 (JP 1-313521 A). According to the electrolytic polymerization method, a conductive polymer film with excellent mechanical strength can be formed in a short period of time from a small quantity of monomers on an electrode. The conductive polymer film formed on the electrode is used in a form where it is peeled from the electrode, or it is also used in a form where it is placed on the electrode as a polymer electrode. In addition, Patent Document 2 (JP 2-15611 A), for example, suggests using a polymer delivered from a 3,4-disubstituted thiophene including EDOT as an conductive polymer layer in a solid electrolytic capacitor that contains a positive electrode made of valve metal foil such as aluminum foil, tantalum foil and niobium foil that has an oxide film as a dielectric on the surface, and an conductive polymer layer that is adjacent to the oxide film and acts as a real negative electrode.

Electrolytic polymerization of thiophenes is normally carried out with a polymerization solution that contains an organic solvent such as ethanol and acetonitrile. This is because the solubility of thiophenes in water is remarkably low and because polymerization is considered to be inhibited by water because the oxidation potential of thiophenes is higher than that of water. For example, in working examples 9 to 14, and 18 to 22 of Patent Document 1, PEDOT is obtained by electrolytic polymerization using a polymerization solution that contains acetonitrile as a solvent and EDOT as a monomer. Also, in a working example 4 of Patent Document 3 (JP 2-58818 A), a solid electrolytic capacitor is obtained by electrolytic polymerization using a polymerization solution that contains acetonitrile as a solvent, diisopropylammonium borodisalicylate as a supporting electrolyte, and 3,4-dimethylthiophene as a monomer. This document also states that a polymerized film with a problem in terms of thermal stability is obtained from a polymerization solution that is prepared by using ammonium borodisalicylate, which has low solubility in an organic solvent, as a supporting electrolyte, and adding water to an organic solvent.

However, the use of an organic solvent generally increases environmental burdens and is economically disadvantageous compared with the use of water. Moreover, many organic solvents are harmful to humans, and in the case of electrolytic polymerization using a combustible solvent, procedures need to be taken to prevent fire by electric sparks. Therefore, for polymerization of thiophenes that dissolve sparingly in water, consideration has been given to using water, which has small environmental burdens and is highly economical, as a solvent, and also to a method to use an anionic surfactant or polymerized anionic surfactant with a sulfonic acid group or a sulfonic acid salt group, and to a method to using an inorganic supporting electrolyte as a supporting electrolyte in the polymerization solution for electrolytic polymerization.

For example, Patent Document 4 (JP 2000-269087 A) discloses a method of preparing a polymer of a thiophene derivative on a positive electrode for a solid electrolytic capacitor, by forming a conductive layer on an oxide film of the positive electrode by chemical polymerization or other methods, introducing this positive electrode in an aqueous polymerization solution in which the thiophene derivative such as EDOT is emulsified by a alkylnaphthalenesulphonate surfactant, and performing electrolytic polymerization. Since the thiophene derivative is condensed in a micelle of the surfactant, polymerization proceeds rapidly, and a conductive polymer layer, in which an anion of the surfactant is doped, is formed on the positive electrode. Because of the bulkiness of an alkylnaphthalenesulfonate anion, which is taken into the polymer layer as a dopant by electrolytic polymerization, de-doping is inhibited, and a solid electrolytic capacitor, which is stable under high temperature and high humidity, is obtained.

Also, Non-patent Document 1 (Synthetic Met. (2009), 159 (5-6) 406-414) reports electrolytic polymerization using an aqueous solution in which EDOT and sodium polystyrene sulfonate as a polymerized anionic surfactant are dissolved. Solubility of EDOT in water is increased by the action of sodium polystyrene sulfonate, EDOT is more prone to be oxidized, and a uniform PEDOT film is formed on a Pt electrode. Patent Document 5 (JP 2006-295184 A) does not relate to electrolytic polymerization, but discloses a method of preparing a conductive polymer on a positive electrode for a solid electrolytic capacitor by forming a conductive layer on an oxide film of the positive electrode by a chemical polymerization method or other methods and then applying on the conductive layer a dispersion that contains conductive polymer particles and a binding agent. The specifically disclosed dispersion is obtained by adding EDOT, iron (III) sulfate and sodium persulfate in an aqueous solution containing polystyrene sulfonic acid that acts as a polymerized anionic surfactant, forming PEDOT/polystyrene sulfonate particles by their reaction in the aqueous solution, and then adding a binding agent and other agents.

Moreover, Non-patent Document 2 (Electrochimica Acta 48 (2003) 1713-1717) reports electrolytic polymerization by the potentiostatic polymerization method in an aqueous solution that contains 0.01 M EDOT and 0.1 M lithium perchlorate as a supporting electrolyte, and Non-patent Document 3 (Synthetic Met. (2010), 160 (15-16), 1636-1641) reports electrolytic polymerization by the potential sweep method in an aqueous solution that contains 0.01 M EDOT and 0.1 M potassium nitrate as a supporting electrolyte.

PRIOR ARTS DOCUMENTS

Patent Documents

Patent Document 1: JP 1-313521 A
Patent Document 2: JP 2-015611 A
Patent Document 3: JP 2-058818 A
Patent Document 4: JP 2000-269087 A
Patent Document 5: JP 2006-295184 A Non-Patent Documents Non-patent Document 1: Synthetic Met. (2009), 159 (5-6) 406-414
Non-patent Document 2: Electrochimica Acta 48 (2003) 1713-1717
Non-patent Document 3: Synthetic Met. (2010), 160 (15-16), 1636-1641

BRIEF SUMMARY OF THE INVENTION

1. Problems to be Solved by the Invention

The use of water as a solvent in a polymerization solution has a smaller environmental burden and is more economically efficient compared with the use of an organic solvent, but due to the above-mentioned problems of low water solubility of thiophenes and inhibition of polymerization by water, an investigation to compare the basic characteristics and heat resistance of conductive polymers obtained from polymerization solution using water as a solvent and conductive polymers obtained from polymerization solution using an organic solvent has not been made sufficiently. Moreover, though anionic surfactants having a sulfonic acid group or a sulfonic acid salt group shown in Patent Document 4, Patent Document 5 and Non-patent Document 1 indeed produce conductive polymers that have excellent heat resistance compared with a smaller-volume supporting electrolyte, but the environment in which solid electrolytic capacitors and electrode materials that contain these conductive polymers as components are used necessitates that the heat resistance of these conductive polymers is further improved.

Therefore, the objective of this invention is to provide a polymerization solution for electrolytic polymerization of thiophenes that have a small environmental burden and excellent economic efficiency, and gives conductive polymers exhibiting excellent heat resistance. Another objective of this invention is to provide a conductive polymer film that has high electrochemical activity and excellent heat resistance as well as a polymer electrode comprising this film. A further objective of this invention is to provide a solid electrolytic capacitor that has low dielectric loss (tan δ) and low equivalent series resistance (ESR) and is excellent in heat resistance.

2. Means for Solving Problems

It was found that the objectives were achieved by a polymerization solution for electrolytic polymerization in which a 3,4-disubstituted thiophene is chosen as a monomer, a solvent that consists of 100 to 80% by mass of water and 0 to 20% by mass of an organic solvent is chosen as a solvent, and an organic non-sulfonate supporting electrolyte having an anion with the molecular weight of 200 or more is chosen as a supporting electrolyte. By mutual interaction among the monomer, the solvent and the supporting electrolyte, a conductive polymer that has excellent heat resistance is formed.

Therefore, the present invention relates to a polymerization solution for electrolytic polymerization comprising a solvent consisting of 100 to 80% by mass of water and 0 to 20% by mass of an organic solvent, at least one monomer selected from the group consisting of 3,4-disubstituted thiophenes, and at least one organic non-sulfonate supporting electrolyte having an anion with the molecular weight of 200 or more. For the purpose of this invention, the "organic non-sulfonate supporting electrolyte" means an organic supporting electrolyte that does not have a sulfonic acid group and/or a sulfonic acid salt group. Moreover, a solvent consisting of 100 to 80% by mass of water and 0 to 20% by mass of an organic solvent is hereinafter referred to as a "water-rich solvent". In the water-rich solvent, the total amount of water and an organic solvent is 100% by mass. The content of water in the water-rich solvent is acceptable if it is 80% by mass or more, but 90% by mass or more is preferable, 95% by mass or more is more preferable, and 100% by mass is particularly preferable.

When an electrode (a substrate of a conductive polymer film and a positive electrode of a solid electrolytic capacitor) is introduced into the polymerization solution of the present invention and electrolytic polymerization is carried out, a conductive polymer in which polymer particles are densely filled is formed on the electrode, and an anion of the supporting electrolyte with the above-mentioned specific range is included in the conductive polymer as a dopant. Further, the conductive polymer film and the polymer electrode which are obtained show high electrochemical activity, and the solid electrolytic capacitor obtained shows decreased tan δ and ESR. Further, the conductive polymer film, polymer electrode and solid electrolytic capacitor obtained show higher heat resistance than the conductive polymer films, polymer electrodes and solid electrolytic capacitors obtained from a polymerization solution that contains an anionic surfactant with a sulfonic acid group or a sulfonic acid salt group, as shown in Patent Document 4, Patent Document 5 and Non-patent Document 1. Further, the conductive polymer film, polymer electrode and solid electrolytic capacitor obtained show higher heat resistance than the conductive polymer films, polymer electrodes and solid electrolytic capacitors obtained from a polymerization solution that contains a large amount of organic solvent. Patent Document 3 shows that the addition of water to a polymerization solution lowers the heat resistance of a polymer film, but in consideration of this, the advantageous effect of the present invention is remarkable.

The polymerization solution of the present invention uses water as a main solvent, therefore it is a polymerization solution that has a small environmental burden and is economically excellent. When the amount of the organic solvent in the water-rich solvent is increased, the layer of the conductive polymer in which polymer particles are densely filled becomes difficult to be formed on the electrode by electrolytic polymerization, and when the amount of the organic solvent contained in the water-rich solvent becomes more than 20% by mass, the heat resistances of the conductive polymer film, of the polymer electrode and of the solid electrolytic capacitor obtained are remarkably lowered.

The supporting electrolyte contained in the polymerization solution of the present invention is selected from the range of the organic non-sulfonate supporting electrolytes having an anion of the molecular weight of 200 or more. From a polymerization solution that contains an inorganic supporting electrolyte, or, even in the case of an organic supporting electrolyte, a supporting electrolyte with a sulfonic acid group and/or a sulfonic acid salt group, or an organic supporting electrolyte that does not have a sulfonic acid group and/or a sulfonic acid salt group but the molecular weight of an anion contained is less than 200, a conductive polymer film, polymer electrode and solid electrolytic capacitor with excellent heat resistance are not obtained.

Especially, it is preferable to use a compound selected from the group consisting of borodisalicylic acid, borodisalicylic salts, a sulfonylimidic acid of the formula (I) or the formula (II)

where m is an integer from 1 to 8, preferably an integer from 1 to 4, especially preferably 2, n is an integer from 1 to 8, preferably an integer from 1 to 4, especially preferably 2, and o is 2 or 3, and salts thereof, as the supporting electrolyte. When a polymerization solution containing any of these supporting electrolytes is used for electrolytic polymerization, a conductive polymer film, polymer electrode and solid electrolytic capacitor with excellent heat resistance can be obtained. Among all compounds, use of a salt of bis(pentafluoroethanesulfonyl)imide acid is especially preferable.

However, a borodisalicylate ion that is contained in borodisalicylic acid and its salts is known to hydrolyze into salicylic acid and boric acid in the water-rich solvent, which have extremely small solubility in the water-rich solvent. Therefore, when borodisalicylic acid and/or its salt are used as a supporting electrolyte, precipitation will be produced in the polymerization solution and it will become unusable. To avoid this, when borodisalicylic acid and/or its salt are used as a supporting electrolyte, electrolytic polymerization is performed after this supporting electrolyte is added to the solution before the precipitation formation, or the supporting electrolyte is used with a stabilizing agent selected from the group consisting of nitrobenzene and nitrobenzene derivatives, which acts to inhibit the hydrolysis of borodisalicylate ions.

In the present invention, a compound selected from the group consisting of 3,4-disubstituted thiophenes can be used without any limitations as a monomer to give a conductive polymer. Substituents at the 3- and 4-positions of the thiophene ring can form a ring with carbons at the 3- and 4-positions. Especially, it is preferable if the monomer is EDOT because a conductive polymer film and polymer electrode, which have excellent permeability (transparency) of optical wavelengths, especially high conductivity and electrochemical activity and excellent heat resistance, are obtained, and a solid electrolytic capacitor, which has especially low tan δ and ESR and has excellent heat resistance, is obtained.

In the present invention, it is acceptable that the monomer of the saturated amount of dissolution or less is contained in a polymerization solution and the total amount of the monomer is dissolved in the polymerization solution, but it is also acceptable that the monomer of more than the saturated amount is contained in the polymerization solution and the monomer that cannot be dissolved is dispersed as oil drops in the polymerization solution. By radiating ultrasonic waves into the solution containing the monomer of more than the saturated amount, it is possible to make the monomer highly dispersed as oil drops in the polymerization solution and a stable polymerization solution in which demulsification is inhibited can be obtained. If the size of the oil drops is minute, a dense conductive polymer film is formed on the electrode by immediate charge transfer between these oil drops and the electrode for electrolytic polymerization. As the size of oil drops becomes larger, immediate charge transfer between the oil drops and the electrode becomes more difficult, and the monomer that is dissolved in the polymerization solution become engaged in electrolytic polymerization exclusively, but because the amount of the monomer equivalent to the consumed amount of monomer due to polymerization is replenished from oil drops near the electrode and is dissolved in the solution, electrolytic polymerization proceeds rapidly. Herein, the "ultrasonic waves" mean sonic waves that have a frequency of 10 kHz or more.

The method itself to make use of irradiation of ultrasonic waves in the preparation of a polymerization solution for electrolytic polymerization is heretofore known. J. AM. CHEM. SOC. (2005), 127(38), 13160-13161 reports the result of the experiment in which a larger amount of EDOT than the saturated amount of dissolution is added to a solution with $LiClO_4$ as a supporting electrolyte, an emulsified polymerization solution in which monomer oil drops are dispersed in water is obtained by radiating ultrasonic waves of frequency 20 kHz and of output 22.6 $W/cm^2$ for 60 seconds (see FIG. 1 of this document), and an electrolytic polymerization layer is formed on a Pt electrode with this polymerization solution. However, this document does not include a statement to suggest the supporting electrolyte to be used in the present invention, or a statement to suggest that a conductive polymer film, polymer electrode, and solid electrolytic capacitor with excellent heat resistance are obtained by mutual interaction of the supporting electrolyte used in this invention, the 3,4-disubstituted thiophene, and the water-rich solvent.

By using the polymerization solution of the present invention, a conductive polymer film which has a high electrochemical activity and excellent heat resistance is formed on the electrode for electrolytic polymerization. This conductive polymer film can be used in the peeled state from the electrode, and, as the adhesion properties of the conductive polymer film and the electrode is excellent, it can be in the form of a placement on the electrode. Therefore, the present invention also relates to a polymer film that is obtained by introducing a substrate with a conductive part at least on the surface into the polymerization solution of the present invention and by performing electrolytic polymerization, and, a polymer electrode comprising a substrate with a conductive part at least on the surface and a conductive polymer film layered on the conductive part of the substrate, in which the conductive polymer film is obtained by introducing the substrate in the polymerization solution of the present invention and then performing electrolytic polymerization. Especially, if the substrate is a transparent substrate and the conductive polymer film is a transparent film containing PEDOT, the polymer electrode is preferably used as a transparent electrode.

By using the polymerization solution of this invention, a solid electrolytic capacitor, which has lowered tan δ and ESR and moreover excellent heat resistance, is obtained.

Therefore, the present invention also relates to the first form of a solid electrolytic capacitor, a solid electrolytic capacitor that comprises a positive electrode made of valve metal foil with an oxide film on the surface and a conductive polymer layer placed on the positive electrode, in which the conductive polymer layer is formed by introducing the positive electrode into the polymerization solution of this invention and by performing electrolytic polymerization. In the first form of the solid electrolytic capacitor, a conductive layer (a dummy negative electrode) is generally formed on the conductive polymer.

The present invention also relates to the second form of a solid electrolytic capacitor, a solid electrolytic capacitor that comprises a positive electrode made of valve metal foil with an oxide film on the surface, a negative electrode made of valve metal foil, and a separator that retains a conductive polymer layer placed between the positive electrode and the negative electrode, in which the conductive polymer layer is formed by introducing a condenser element comprising the positive electrode, the negative electrode, and a separator therebetween into the polymerization solution of the present invention and performing electrolytic polymerization. The conductive polymer layer is retained in the separator by electrolytic polymerization. The capacitor of this form is preferably used as a wound or layered capacitor.

3. Advantageous Effects of the Invention

The polymerization solution for electrolytic polymerization of the present invention that contains a 3,4-disubstituted thiophene, a water-rich solvent, and an organic non-sulfate supporting electrolyte having an anion with the molecular weight of 200 or more is a polymerization solution that has a small environmental burden and is economically excellent because water is used as a main solvent. Moreover, the conductive polymer film and polymer electrode that are obtained by electrolytic polymerization using the present polymerization solution show high electrochemical activity and excellent heat resistance. Moreover, the solid electrolytic capacitor obtained by electrolytic polymerization using the present polymerization solution shows excellent heat resistance as well as lowered tan δ and ESR.

DETAILED DESCRIPTION OF THE INVENTION (1) Polymerization Solution

A polymerization solution for electrolytic polymerization of the present invention comprises as essential constituents a water-rich solvent, a monomer selected from 3,4-disubstituted thiophenes, and an organic non-sulfonate supporting electrolyte having an anion with the molecular weight of 200 or more. In the polymerization solution of the present invention, water, which has a small environmental burden and is economically excellent, is used as a main solvent. In the polymerization solution of the present invention, an organic solvent such as methanol, ethanol, isopropanol, butanol, ethylene glycol, acetonitrile, acetone, tetrahydrofuran, and methyl acetate may be contained, but 80% by mass or more of the total solvent is water. Water is preferably 90% by mass or more of the total, more preferably 95% by mass or more of the total, and it is especially preferred that the solvent consists only of water. When the amount of the organic solvent contained in the water-rich solvent is increased, a conductive polymer film in which polymer particles are densely filled becomes difficult to be formed on an electrode by electrolytic polymerization, and if the amount of the organic solvent contained exceeds 20% by mass of the whole solvent, the heat resistance of a conductive polymer film, polymer electrode and solid electrolytic capacitor obtained is remarkably lowered.

In the polymerization solution of the present invention, the monomer selected from 3,4-disubstituted thiophenes is preferably used as a monomer. Substituents at the 3- and 4-positions of the thiophene ring can form a ring with carbons at the 3- and 4-positions. Examples of monomers that can be used are; 3-alkylthiophenes such as 3-methylthiophene and 3-ethylthiophene; 3,4-dialkylthiophenes such as 3,4-dimethylthiophene and 3,4-diethylthiophene; 3-alkoxythiophenes such as 3-methoxythiophene and 3-ethoxythiophene; 3,4-dialkoxythiophenes such as 3,4-dimethoxythiophene and 3,4-diethoxythiophene; 3,4-alkylenedioxythiophenes such as 3,4-methylenedioxythiophene, EDOT and 3,4-(1,2-propylenedioxy)thiophene; 3,4-alkyleneoxythiathiophenes such as 3,4-methyleneoxythiathiophene, 3,4-ethyleneoxythiathiophene and 3,4-(1,2-propyleneoxythia)thiophene; 3,4-alkylenedithiathiophenes such as 3,4-methylenedithiathiophene, 3,4-ethylenedithiathiophene and 3,4-(1,2-propylenedithia)thiophene; and alkylthieno[3,4-b]thiophenes such as thieno[3,4-b]thiophene, isopropylthieno[3,4-b]thiophene and t-butyl-thieno[3,4-b]thiophene. The monomer can be a single compound or two or more types of compounds. In particular, usage of EDOT is preferred.

In the polymerization solution of the present invention, the organic non-sulfonate supporting electrolyte having an anion with the molecular weight of 200 or more is used. An anion of the supporting electrolyte are contained in a conductive polymer film as a dopant in the following process of electrolytic polymerization.

Especially, borodisalicylic acid, borodisalicylic salts, a sulfonylimidic acid represented by equation (I) or equation (II), and its salts, can be preferably used as the supporting electrolytes.

In the equations, m means an integer number of 1 to 8, preferably an integer number of 1 to 4, especially preferably 2, n means an integer number of 1 to 8, preferably an integer number of 1 to 4, especially preferably 2, and o means 2 or 3. For salts, alkali metal salts such as lithium salt, sodium salt and potassium salt; ammonium salt; alkylammonium salts such as ethylammonium salt and butylammonium salt; dialkylammonium salts such as diethylammonium salt and dibutylammonium salt; trialkylammonium salts such as triethylammonium salt and tributylammonium salt; and tetraalkylammonium salts such as tetraethylammonium salt and tetrabutylammonium salt can be exemplified. These supporting electrolytes give conductive polymers with especially excellent heat resistance. Among them, a salt of bis(pentafluoroethanesulfonyl)imide, such as potassium salt, sodium salt, and ammonium salt is remarkably preferable. The supporting electrolyte can be a single compound or two or more types of compounds, which is used in a concentration of the saturated amount of dissolution or less in the polymerization solution and at an amount with which a sufficient electric current for polymerization can be obtained. The supporting electrolyte is used preferably in a concentration of 10 mM or more. In case borodisalicylic acid and/or borodisalicylic salt are used as a supporting electrolyte, it is added to the solution immediately before electrolytic polymerization, or it is used with a stabilizing agent selected from the group consisting of nitrobenzene and nitrobenzene derivatives. The stabilizing agent has an action to inhibit the hydrolysis of borodisalicylate ions. The stabilizing agent can be a single compound or or two or more types of compounds. Examples of nitrobenzene derivatives are: nitrophenol, nitrobenzyl alcohol, nitrobenzoic acid, dinitrobenzoic acid, dinitrobenzene, nitroanisole and nitroacetophenone. O-nitrophenol, m-nitrophenol, p-nitrophenol, or a mixture of these is preferred.

Preparation of the polymerization solution is performed by the following methods according to the contained amount of the monomer. When the amount of the monomer is a saturated amount of dissolution or less, a polymerization solution is prepared by introducing into a container for manufacturing a polymerization solution the water-rich solvent, a 3,4-disubstituted thiophene as the monomer, and the supporting electrolyte of the specific ranges mentioned above, and by dissolving each component to the water-rich solvent by hand process or by use of a mechanical stirring means. When the amount of the monomer exceeds a saturated amount of dissolution, that is, when the monomer undergoes phase separation by introducing into a container for manufacturing a polymerization solution the water-rich solvent, a 3,4-disubstituted thiophene as the monomer, and the supporting electrolyte of the specific ranges mentioned above and by standing still after stirring and homogenization, the polymerization solution can be prepared by dispersing the phase-separated monomer as oil drops in the polymerization solution by giving ultrasonic wave irradiation to the solution. The polymerization solution of the present invention can also be obtained by dispersing the monomer as oil drops with ultrasonic wave irradiation to a solution in which the monomer at an amount exceeding the saturated amount of dissolution is added to the water-rich solvent, and by adding the supporting electrolyte to the solution obtained. If the each component in the polymerization solution is stable, there is no restriction on the temperature at the time of preparation.

For ultrasonic wave irradiation, an ultrasonic wave oscillator that is heretofore known, such as an ultrasonic wave washing machine and a cell crusher, can be used without any particular restriction. In order to obtain by ultrasonic wave irradiation a solution in which monomer oil drops are stably dispersed in the water-rich solvent, it is necessary to change the phase-separated monomer to oil drops of a diameter of several μm or less. To achieve this, it is necessary to irradiate the phase-separated solution with ultrasonic waves having a frequency of 15 to 200 kHz, which can generate a cavitation of at least several hundreds of nm to several μm with a strong mechanical action. It is preferable that the output of ultrasonic waves is 4 or more w/cm². Although there is no strict limitation on the time of the ultrasonic wave irradiation, it is preferably within a range of 2 to 10 minutes. If the irradiation time is longer, there is a tendency that aggregation of the monomer oil drops is inhibited and that the time for demulsification is longer, but when the time of the ultrasonic wave irradiation is 10 minutes or more, a tendency that the effect of inhibiting aggregation of the oil drops is saturated. It is also possible to perform more than one irradiations by using ultrasonic waves with different frequencies and/or outputs. The contained amount of monomer exceeding the saturated amount of dissolution is appropriate as long as it is an amount to obtain a dispersion solution in which demulsification is inhibited by ultrasonic wave irradiation and varies according to not only the type of monomer, but also the type and amount of a supporting electrolyte and the condition of ultrasonic wave irradiation.

The polymerization solution of the present invention may contain other additives insofar as they do not give harmful influence on the present invention in addition to the water-rich solvent, the monomer selected from 3,4-disubstituted thiophenes, and the supporting electrolyte within the above-mentioned specific range. A water-soluble nonionic surfactant can be referred to as a preferable additive. Because the monomer is condensed in a micelle of the nonionic surfactant, electrolytic polymerization progresses rapidly, and a polymer exhibiting high conductivity can be obtained. In addition, the nonionic surfactant itself is not ionized, and doping to a polymer by an anion of the supporting electrolyte within the above-mentioned specific range is not inhibited. Therefore, heat resistance of the conductive polymer obtained by electrolytic polymerization is not decreased.

As the nonionic surfactant, a water-soluble nonionic surfactant heretofore known can be used without particular restriction. It is possible to use, for example, polyalkylene glycol, polyvinyl alcohol, polyoxyalkylene alkyl ether, polyoxyalkylene alkylphenyl ether, polyoxyalkylene styrylphenyl ether, polyoxyalkylene benzylphenyl ether, polyoxyalkylene alkylphenol ether formaldehyde condensate, polyoxyalkylene styrylphenol ether formaldehyde condensate, polyoxyalkylene benzylphenol ether formaldehyde condensate, alkynediol, polyoxyalkylene alkynediol ether, polyoxyalkylene fatty acid ester, polyoxyalkylene sorbitan fatty acid ester, polyoxyalkylene castor oil, polyoxyalkylene hardened castor oil, polyglycerol alkyl ether and polyglycerol fatty acid ester. These can be used alone or used by mixing two or more types. It is preferable to use in the polymerization solution a combination of an alkynediol having a high dispersion effect such as 2,4,7,9-tetramethyl-5-decyne-4,7-diol with other nonionic surfactants, preferably a polyoxyethylene alkylphenyl ether such as branched polyoxyethylene(9) nonylphenyl ether, because the contained amount of monomer in the polymerization solution can be increased to a great extent.

If the nonionic surfactant is used concurrently, a polymerization solution is prepared by introducing into a container for manufacturing a polymerization solution the water-rich solvent, the monomer, the supporting electrolyte within the above-mentioned specific range and the nonionic surfactant, and by dissolving each component into the water-rich solvent by hand processing or a mechanical stirring means or an ultrasonic wave radiation. Also, after introducing into a container for producing a polymerization solution the water-rich solvent, the monomer, and the nonionic surfactant and preparing a solution in which each component is dissolved in the water-rich solvent, dissolution can be made by adding the supporting electrolyte within the above-mentioned specific range to this solution immediately before electrolytic polymerization.

(2) Electrolytic Polymerization

By electrolytic polymerization using the polymerization solution of the present invention, a conductive polymer with high heat resistance is formed. Electrolytic polymerization using the polymerization solution of the present invention is performed to form a conductive polymer film for various applications as well as to form a conductive polymer layer in a solid electrolytic capacitor. Hereinafter, electrolytic polymerization to form a general conductive polymer film and electrolytic polymerization to form a conductive polymer layer in a solid electrolytic capacitor are explained separately.

(a) General Conductive Polymer Film

As a working electrode (a substrate of a conductive polymer film) introduced into the polymerization solution of the present invention, a material having a conductive part at least on its surface is used, and aboard, a foil, a net, a sintered compact, a foam of conductive material such as platinum, nickel, titanium, steel and carbon can be used. Also, a transparent substrate in which a vapor deposition layer of a semiconductor ceramic such as tin-doped indium oxide (ITO), tin oxide and fluorine-doped tin oxide is disposed on the surface of transparent and insulated glass or plastic can be used as the working electrode. If EDOT is used as a monomer, a transparent electrode with a transparent PEDOT film can be obtained by using this transparent substrate. As a counter electrode, a board of platinum, nickel and the like can be used.

Electrolytic polymerization is performed using the polymerization solution of the present invention by any of a potentiostatic method, a galvanostatic method or a potential sweep method. In the case of the potentiostatic method, a potential of 1.0 to 1.5 V for a saturated calomel electrode is preferable though this depends on the type of monomer; and in the case of galvanostatic method, a current value of 1 to 10000 $\mu A/cm^2$ is preferable though this depends on the type of monomer; and in the case of the potential sweep method, it is preferable to sweep a range of 0 to 1.5 V for a saturated calomel electrode at a velocity of 5 to 200 mV/s though this depends on the type of monomer. By the electrolytic polymerization, a conductive polymer film is formed on the substrate, preferably with a thickness of 0.001 to 50 $\mu m$. There is no strict limitation on the polymerization temperature, but it is generally within a range of 10 to 60 degrees centigrade. The polymerization time is in general within a range of 0.6 seconds to 10 hours.

To obtain a PEDOT film with a significantly high transparency, it is preferable that the galvanostatic polymerization is performed at a current of 5 to 500 $\mu A/cm^2$, preferably at 10 to 100 $\mu A/cm^2$, for 0.6 to 120 seconds, preferably 6 to 60 seconds. By the electrolytic polymerization under this condition, it is possible to obtain a PEDOT film having a significantly high transparency and a thickness of 0.001 to 0.05 $\mu m$, and preferably of 0.03 to 0.035 $\mu m$.

By washing the conductive polymer film after the electrolytic polymerization with water, ethanol or other liquid and drying it, the conductive polymer film having excellent electrochemical activity and excellent heat resistance can be obtained on the substrate. Since the conductive polymer film of the present invention has excellent adhesiveness with the substrate, it can be used in a configuration disposed on the substrate as a polymer electrode, and the relatively thick conductive polymer film can be exfoliated from the substrate before use.

When the above-mentioned transparent substrate is used as a substrate and the transparent PEDOT film is formed on the substrate, it is possible to obtain a transparent electrode with excellent heat resistance, high conductivity and high electrochemical capacity while it remains disposed on the substrate. The transparent electrode can be preferably used as a component of various electronic devices such as an organic electroluminescence device and a touch panel display. Further, it is possible to preferably use the PEDOT film as an independent and flexible transparent electrode by exfoliating the film from the substrate and making it a conductive transparent film. It is also possible to prevent static charge by applying the highly transparent PEDOT film to a plastic tray or plastic sheet of insulation without affecting their appearances.

(b) Solid Electrolytic Capacitor of First Form

The solid electrolytic capacitor of the first form of the present invention comprises a positive electrode made of a valve metal foil with an oxide film on its surface and a conductive polymer layer disposed on the positive electrode. To obtain the positive electrode, valve metal foil such as aluminum foil, tantalum foil, niobium foil and titanium foil, preferably aluminum foil, is subjected to a surface enlargement treatment by a chemical or electrochemical etching, and then subject to a formation treatment in an aqueous ammonium adipate solution, an aqueous ammonium phosphate solution and the like to form an oxide film on the surface thereof.

The conductive polymer layer can be directly formed on the oxide film of the positive electrode by using a leakage current of the oxide film. Further, it is possible to dispose a conductive film on the oxide film in advance and to form the conductive polymer layer thereon. For example, the conductive polymer layer may be formed after forming electrical micro defects in the oxide film of the positive electrode by exposing the oxide film to a corrosive gas such as halogen gas, or a corrosive liquid such as an aqueous acid solution. In other way, the conductive polymer layer may be formed after immersing the oxide film of the positive electrode into an aqueous manganese nitrate solution and pyrolyzing at 300 to 400 degrees centigrade to form a manganese oxide layer on the surface of the oxide film. However, considering the stability of the oxide film of the positive electrode and the polymerization efficiency of the conductive polymer, it is preferable to arrange a chemical polymerized film of the monomer on the oxide film and to form the conductive polymer layer on the chemical polymerized film.

The preparation of the chemical polymerized film can be performed by preparing a solution in which both the monomer and an oxidizing agent are dissolved in a solvent such as water, methanol, ethanol, isopropanol, butanol and acetonitrile, applying the solution to the oxide film of the positive electrode by brush application, drop application, immersion application, spray application etc., and drying it. In other way, it can be performed by preparing a solution in which the monomer is dissolved in a solvent such as water, methanol, ethanol, isopropanol, butanol and acetonitrile and a solution in which an oxidizing agent is dissolved in a solvent such as water, methanol, ethanol, isopropanol, butanol and acetonitrile, applying these solutions in alternation on the oxide film of the positive electrode by brush application, drop application, immersion application, spray application etc., and drying them. As the oxidizing agent, it is possible to use a trivalent iron salt such as iron (III) paratoluenesulfonate, iron (III) naphthalenesulfonate and iron (III) anthraquinonesulfonate, or a persulfate salt such as ammonium peroxodisulfate and sodium peroxodisulfate. It is possible to use a single compound and to use two or more types of compounds.

Then, the electrolytic polymerization is performed by introducing into the polymerization solution of the present invention the positive electrode in which conductivity is imparted to the oxide film, together with a counter electrode. As the counter electrode for the electrolytic polymerization, it is possible to use a board of platinum, nickel and the like.

Electrolytic polymerization is performed by any of a potentiostatic method, a galvanostatic method or a potential sweep method. In the case of the potentiostatic method, a potential of 1.0 to 1.5 V for a saturated calomel electrode is preferable though this depends on the type of monomer. In the case of the galvanostatic method, a current value of 1 to 10000 $\mu A/cm^2$ is preferable though this depends on the type of monomer. In the case of the potential sweep method, it is preferable to sweep a range of 0 to 1.5 V for a saturated calomel electrode at a velocity of 5 to 200 mV/s though this depends on the type of monomer. There is no strict limitation on the polymerization temperature, but it is generally within a range of 10 to 60 degrees centigrade. The polymerization time is generally within a range of 1 minute to 10 hours.

The solid electrolytic capacitor of the first form is obtained by washing the conductive polymer layer formed on the positive electrode with water, ethanol or the like, drying it, and then forming a conductive layer (dummy negative electrode) on the conductive polymer layer by carbon paste, silver paste or the like.

(c) Solid Electrolytic Capacitor of Second Form

The solid electrolytic capacitor of the second form comprises a positive electrode made of valve metal foil having an oxide film on its surface, a negative electrode made of valve metal foil and a separator that retains a conductive polymer layer placed between the positive electrode and the negative electrode. Prior to electrolytic polymerization, a capacitor element comprising a positive electrode made of valve metal foil having an oxide film on its surface, a negative electrode made of valve metal foil and a separator arranged between the positive electrode and the negative electrode is obtained.

The positive electrode is prepared in the same way as the positive electrode in the solid electrolytic capacitor of the first form. That is, valve metal foil such as aluminum foil, tantalum foil, niobium foil and titanium foil, preferably aluminum foil, is subjected to a surface enlargement treatment by a chemical or electrochemical etching, and then subject to a formation treatment in aqueous ammonium adipate solution, aqueous ammonium phosphate solution and the like to form an oxide film on the surface thereof. For the negative electrode, valve metal foil such as aluminum foil, tantalum foil, niobium foil and titanium foil, preferably aluminum foil, is subjected to a surface enlargement treatment by a chemical or electrochemical etching. As the separator, it is possible to use Manila paper, kraft paper, synthetic fiber paper, glass paper and a mixed paper of glass paper and Manila paper or kraft paper.

The capacitor element is obtained by winding or laminating the positive electrode and the negative electrode together with the separator therebetween. Then, by preparing a solution in which both the monomer and an oxidizing agent are dissolved in a solvent such as water, methanol, ethanol, isopropanol, butanol and acetonitrile, immersing the capacitor element in the solution, and then heating the capacitor element to dry it, chemical polymerized films are formed on the surfaces of the positive electrode and the negative electrode. As the oxidizing agent, it is possible to use a trivalent iron salt such as iron (III) paratoluenesulfonate, iron (III) naphthalenesulfonate and iron (III) anthraquinonesulfonate, or a persulfate salt such as ammonium peroxodisulfate and sodium peroxodisulfate. It is possible to use a single compound and to use two or more types of compounds.

The electrolytic polymerization is performed after washing the capacitor element with water, ethanol and the like, drying it, and then introducing it into the polymerization solution of the present invention.

The electrolytic polymerization is performed by any of a potentiostatic method, a galvanostatic method or a potential sweep method. In the case of the potentiostatic method, a potential of 1.0 to 1.5 V for a saturated calomel electrode is preferable though this depends on the type of monomer. In the case of the galvanostatic method, a current value of 1 to 10000 $\mu A/cm^2$ is preferable though this depends on the type of monomer. In the case of the potential sweep method, it is preferable to sweep a range of 0 to 1.5 V for a saturated calomel electrode at a velocity of 5 to 200 mV/s though this depends on the type of monomer. There is no strict limitation on the polymerization temperature, but it is generally within a range of 10 to 60 degrees centigrade. The polymerization time is generally within a range of 1 minute to 10 hours.

After the electrolytic polymerization, by washing the conductive polymer layer retained by the separator with water, ethanol or the like, and drying it, the solid electrolytic capacitor of the second form having excellent heat resistance is obtained.

The solid electrolytic capacitor of the first form and the solid electrolytic capacitor of the second form have excellent heat resistance as well as reduced tan δ and ESR.

EXAMPLES

The examples of the present invention are shown as follows, but the present invention is not limited to the following examples.

(A) Solid Electrolytic Capacitor
(1) Influence of Supporting Electrolyte (a) Production Example 1

A solution was obtained by introducing 50 mL of distilled water into a glass container, adding 0.113 g (concentration; 0.016 M) of EDOT to this solution and stirring it at 25 degrees centigrade for 60 minutes. The total amount of EDOT was dissolved in water. Then, ammonium borodisalicylate at the concentration of 0.08 M was dissolved in this solution to obtain a polymerization solution.

An etched aluminum foil was subjected to the formation treatment to obtain a oxide film with pressure resistance of 3 V and was then punched out to 1×1 cm$^2$ of a projected area to make it a positive electrode. This positive electrode was immersed in an ethanol solution containing 20% by mass of EDOT and was then dried at room temperature. Then, it was immersed in an ethanol solution containing iron (HI) paratoluenesulfonate as an oxidizing agent with a concentration of 20% by mass, dried at room temperature for 10 minutes and then high-temperature treatment was performed on it. A chemical polymerized film of PEDOT was formed on the oxide film of the positive electrode by repeating the chemical oxidation polymerization process. The positive electrode having the chemical polymerized film of PEDOT obtained was subjected to the re-formation treatment in an aqueous ammonium adipate solution, and then it was water-washed and dried.

Then, galvanostatic electrolytic polymerization was performed for 60 minutes under a current condition of 0.5 mA/cm$^2$ by using the polymerization solution, the positive electrode with the chemical polymerized film of PEDOT as a working electrode, a Pt foil having an area of 4 cm×4 cm as a counter electrode, and a silver-silver chloride electrode as a reference electrode. The polymerized film was washed with ethanol, water-washed, and then dried. Lastly, a graphite paste was applied on the electrolytic polymerization layer of PEDOT and drying, and then silver paste was applied on it and drying, to obtain a solid electrolytic capacitor having a positive electrode having an oxide film with pressure resistance of 3 V.

Example 2

The procedure of Example 1 was repeated, except that sodium bis(pentafluoroethane sulfonyl)imide was used instead of ammonium borodisalicylate.

Example 3

The procedure of Example 1 was repeated, except that potassium bis(nonafluorobutanesulfonyl)imide was used instead of ammonium borodisalicylate.

Example 4

The procedure of Example 1 was repeated, except that ammonium bis(nonafluorobutanesulfonyl)imide was used instead of ammonium borodisalicylate.

Example 5

The procedure of Example 1 was repeated, except that potassium 1,1,2,2,3,3-hexafluoro-1,3-disulfonylimide was used instead of ammonium borodisalicylate.

Example 6

The procedure of Example 1 was repeated, except that sodium 1,1,2,2,3,3-hexafluoro-1,3-disulfonylimide was used instead of ammonium borodisalicylate.

Example 7

The procedure of Example 1 was repeated, except that ammonium 1,1,2,2,3,3-hexafluoro-1,3-disulfonylimide was used instead of ammonium borodisalicylate.

Example 8

A solution was obtained by introducing 50 mL of distilled water into a glass container, adding 0.14 g (concentration; 0.02 M) of EDOT to this solution. EDOT and water were phase-separated. When ultrasonic waves of 20 kHz frequency and 2.6 w/cm$^2$ output were radiated into this solution for 5 minutes, an emulsion in which EDOT was dispersed in water as oil drops was obtained. The size of the EDOT oil drops of this solution were measured by a dynamic light scattering method at 25 degrees centigrade. The number average size of the oil drops was 214 nm. Then, a polymerization solution was obtained by adding 0.08 M of ammonium borodisalicylate to this solution.

Then, galvanostatic electrolytic polymerization was performed for 60 minutes under a current condition of 0.5 mA/cm$^2$ by using the polymerization solution obtained, the positive electrode with the chemical polymerized film of PEDOT used in Example 1 as a working electrode, a Pt foil having an area of 4 cm×4 cm as a counter electrode, and a silver-silver chloride electrode as a reference electrode. The polymerized film was washed with ethanol, water-washed, and then dried. Lastly, a graphite paste was applied on the electrolytic polymerization layer of PEDOT and drying, and then silver paste was applied on it and drying, to obtain a solid electrolytic capacitor having a positive electrode having an oxide film with pressure resistance of 3 V.

Comparative Example 1

A polymerization solution was obtained by introducing 50 mL of water into a glass container, adding to this solution 0.14 g (concentration; 0.02 M) of EDOT and 1.08 g (concentration; 0.08 M) of sodium butylnaphthalenesulfonate as an anionic surfactant having a sulfonic acid salt group, then stirring them at 25 degrees centigrade for 60 minutes. Then, galvanostatic electrolytic polymerization was performed for 60 minutes under a current condition of 0.5 mA/cm$^2$ by using the polymerization solution, the positive electrode with the chemical polymerized film of PEDOT used in Example 1 as a working electrode, a Pt foil having an area of 4 cm×4 cm as a counter electrode, and a silver-silver chloride electrode as a reference electrode. The polymerized film was washed with ethanol, water-washed, and then dried. Lastly, a graphite paste was applied on the electrolytic polymerization layer of PEDOT and drying, and then silver paste was applied on it and drying, to obtain a solid electrolytic capacitor having a positive electrode having an oxide film with pressure resistance of 3 V.

Comparative Example 2

The positive electrode having a chemical polymerized film of PEDOT used in Example 1 was used. Separately prepared slurry in which PEDOT and polystyrene sulfonic acid were dispersed was applied on the chemical polymerized film of the positive electrode and dried. Lastly, a graphite paste was applied on the layer obtained from the slurry in which PEDOT and polystyrene sulfonic acid were dispersed and drying, and then silver paste was applied on it and drying, to obtain a solid electrolytic capacitor having a positive electrode having an oxide film with pressure resistance of 3 V.

Comparative Example 3

A solution was obtained by introducing 50 mL of distilled water into a glass container, adding 0.104 g (concentration; 0.0147 M) of EDOT to this solution and stirring it at 25 degrees centigrade for 60 minutes. The total amount of EDOT was dissolved in water. Then, sodium p-toluenesulfonate at the concentration of 0.08 M was dissolved in this solution to obtain a polymerization solution. Then, galvanostatic electrolytic polymerization was performed for 200 minutes under a current condition of 0.5 mA/cm$^2$ by using the polymerization solution, the positive electrode with the chemical polymerized film of PEDOT used in Example 1 as a working electrode, a Pt foil having an area of 4 cm×4 cm as a counter electrode, and a silver-silver chloride electrode a reference electrode. The polymerization was performed for a longer duration than the 60 minutes of Example 1 because an electrolytic polymerization layer of PEDOT thick enough to be able to constitute a solid electrolytic capacitor could not be gained by polymerization of 60 minutes' duration. The polymerized film was washed with ethanol, water-washed, and then dried. Lastly, a graphite paste was applied on the electrolytic polymerization layer of PEDOT and drying, and then silver paste was applied on it and drying, to obtain a solid electrolytic capacitor having a positive electrode having an oxide film with pressure resistance of 3 V.

Comparative Example 4

The procedure of Comparative Example 3 was repeated by using citric acid instead of sodium p-toluenesulfonate, though the time for electrolytic polymerization was 60 minutes.

Comparative Example 5

The procedure of Comparative Example 3 was repeated by using potassium nitrate instead of sodium p-toluenesulfonate. The duration of polymerization was extended to 300 minutes because an electrolytic polymerization layer of PEDOT thick enough to be able to constitute a solid electrolytic capacitor could also not be gained by polymerization of 60 minutes' duration.

Comparative Example 6

The procedure of Comparative Example 3 was repeated by using sodium sulfate instead of sodium p-toluenesulfonate. The duration of polymerization was extended to 120 minutes because an electrolytic polymerization layer of PEDOT thick enough to be able to constitute a solid electrolytic capacitor could also not be gained by polymerization of 60 minutes' duration.

(b) Characteristic Evaluation

For the capacitors of Examples 1 to 8 and Comparative Examples 1 to 6, a real-capacitance recovery (real-CR) and tan δ in 120 Hz, as well as ESR in 100 kHz were measured. The results are shown in Table 1. The "real-capacitance recovery" means a capacitance recovery calculated on the basis of a capacitance of an oxide film after forming a chemical polymerized film and an electrolytic polymerization layer of PEDOT.

Further, for these capacitors, changes in the real-capacitance recovery in 120 Hz and ESR in 100 kHz were evaluated by performing thermal aging in the atmosphere at 150 degree centigrade for 600 hours. The results are shown in Table 2.

TABLE 1

|  | Real-CR (%) | tan δ | ESR (mΩ) |
| --- | --- | --- | --- |
| Example1 | 69 | 0.032 | 2.2 |
| Example2 | 78 | 0.036 | 2.7 |
| Example3 | 79 | 0.038 | 2.4 |
| Example4 | 78 | 0.039 | 2.6 |
| Example5 | 77 | 0.036 | 2.1 |
| Example6 | 77 | 0.036 | 2.3 |
| Example7 | 79 | 0.039 | 2.6 |
| Example8 | 70 | 0.033 | 2.2 |
| Comparative Example1 | 66 | 0.038 | 3.0 |
| Comparative Example2 | 68 | 0.040 | 4.9 |
| Comparative Example3 | 60 | 0.040 | 3.4 |
| Comparative Example4 | 71 | 0.070 | 128 |
| Comparative Example5 | 58 | 0.056 | 5.1 |
| Comparative Example6 | 69 | 0.068 | 12.9 |

TABLE 2

|  | ΔReal-CR (%) | ΔESR (%) |
| --- | --- | --- |
| Example1 | 87 | 640 |
| Example2 | 91 | 170 |
| Example3 | 91 | 330 |
| Example4 | 96 | 260 |
| Example5 | 87 | 670 |
| Example6 | 90 | 490 |
| Example7 | 95 | 350 |
| Example8 | 88 | 650 |
| Comparative Example1 | 70 | 1600 |
| Comparative Example2 | 90 | 2200 |
| Comparative Example3 | 38 | 20000 |
| Comparative Example4 | 84 | 800 |
| Comparative Example5 | 39 | 17500 |
| Comparative Example6 | 36 | 83700 |

As can be understood from Table 1, the values of real-capacitance recovery of the solid electrolytic capacitors of Examples 1 to 8 were the same or larger, the ESR values thereof were lower, and the tan δ values thereof were also the same or lower, compared with the solid electrolytic capacitors of Comparative Examples 1 to 6. Therefore, it is found that the solid electrolytic capacitors of the present invention had lower tan δ and ESR.

Also, as is understood from Table 2, while ESR of the capacitors of Comparative Examples 1 to 6 reached 8 and 837 times as high as the initial values, respectively, after experiencing a high temperature of 150 degrees centigrade for 600 hours, ESR of the capacitors of Examples 1 to 8 was kept 1.7 to 6.7 times as high as the initial values even after experiencing a high temperature of 150 degrees centigrade for 600 hours. Also, the change of the real-capacitance recovery of the capacitors of Examples 1 to 8 was the same or smaller than the change in the capacitors of Comparative Examples 1 to 6. Therefore, it was found that the solid electrolytic capacitors of the present invention had high heat resistance. Further, the capacitor of Example 1 showed almost the same initial characteristic and thermal durability as the capacitor of Example 8, and so it was found that regardless of whether EDOT in a polymerization solution was less than a saturated amount of dissolution or exceeded the saturated amount, it was possible to obtain a capacitor that has an equal initial characteristic and excellent heat resistance.

Conventionally, in order to increase a concentration of EDOT with poorly water solubility in water, an anionic surfactant with a sulfonic acid group or a sulfonic acid salt group has been frequently used as a supporting electrolyte, and it is reported that a solid electrolytic capacitor comprising a PEDOT layer in which an anion of the surfactant is doped has excellent thermal durability because de-doping is inhibited by the bulkiness of the dopant (See Patent Document 4). Comparing the results in Table 2 for the capacitor of Comparative Example 1 (dopant: butylnaphthalenesulfonate ion), that of Comparative Example 2 (dopant: polystyrenesulfonate ion) and that of Comparative Example 3 (dopant: p-toluenesulfonate ion), it was certainly found that bulky dopants significantly improved heat resistance, but the solid electrolytic capacitors of Examples 1 to 8 showed even more excellent heat resistance compared with those of Comparative Examples 1 and 2. Especially, the solid electrolytic capacitor of Example 2, which was obtained from the polymerization solution containing sodium bis(pentafluoroethanesulfonyl)imide as the supporting electrolyte, showed remarkably excellent thermal stability.

(2) Influence of Organic Solvents (a) Production

Example 9

A solution was obtained by introducing 50 mL of distilled water into a glass container, adding 0.105 g (concentration; 0.0148 M) of EDOT to this solution and stirring it at 25 degrees centigrade for 60 minutes. The total amount of EDOT was dissolved in water. Then, ammonium borodisalicylate at the concentration of 0.08 M was dissolved in this solution to obtain a polymerization solution.

Then, galvanostatic electrolytic polymerization was performed for 10 minutes under a current condition of 3.16 mA/cm$^2$ by using the polymerization solution, the positive electrode with the chemical polymerized film of PEDOT used in Example 1 as a working electrode, a Pt foil having an area of 4 cm×4 cm as a counter electrode, and a silver-silver chloride electrode as a reference electrode. The polymerized film was washed with ethanol, water-washed, and then dried. Lastly, a graphite paste was applied on the electrolytic polymerization layer of PEDOT and drying, and then silver paste was applied on it and drying, to obtain a solid electrolytic capacitor having a positive electrode having an oxide film with pressure resistance of 3 V.

Example 10

A solution was obtained by introducing 50 mL of a mixed solvent of distilled water and ethanol at the mass ratio of 95:5 into a glass container, adding 0.105 g (concentration; 0.0148 M) of EDOT to this solution and stirring it at 25 degrees centigrade for 60 minutes. The total amount of EDOT was dissolved in water. Then, ammonium borodisalicylate at the concentration of 0.08 M was dissolved in this solution to obtain a polymerization solution.

Then, galvanostatic electrolytic polymerization was performed for 10 minutes under a current condition of 3.16 mA/cm$^2$ by using the polymerization solution, the positive electrode with the chemical polymerized film of PEDOT used in Example 1 as a working electrode, a Pt foil having an area of 4 cm×4 cm as a counter electrode, and a silver-silver chloride electrode as a reference electrode. The polymerized film was washed with ethanol, water-washed, and then dried. Lastly, a graphite paste was applied on the electrolytic polymerization layer of PEDOT and drying, and then silver paste was applied on it and drying, to obtain a solid electrolytic capacitor having a positive electrode having an oxide film with pressure resistance of 3 V.

Example 11

A solution was obtained by introducing 50 mL of a mixed solvent of distilled water and ethanol at the mass ratio of 80:20 into a glass container, adding 0.105 g (concentration; 0.0148 M) of EDOT to this solution and stirring it at 25 degrees centigrade for 60 minutes. The total amount of EDOT was dissolved in water. Then, ammonium borodisalicylate at the concentration of 0.08 M was dissolved in this solution to obtain a polymerization solution.

Then, galvanostatic electrolytic polymerization was performed for 10 minutes under a current condition of 3.16 mA/cm$^2$ by using the polymerization solution, the positive electrode with the chemical polymerized film of PEDOT used in Example 1 as a working electrode, a Pt foil having an area of 4 cm×4 cm as a counter electrode, and a silver-silver chloride electrode as a reference electrode. The polymerized film was washed with ethanol, water-washed, and then dried. Lastly, a graphite paste was applied on the electrolytic polymerization layer of PEDOT and drying, and then silver paste was applied on it and drying, to obtain a solid electrolytic capacitor having a positive electrode having an oxide film with pressure resistance of 3 V.

(b) Characteristic Evaluation

For the solid electrolytic capacitors of Examples 9 to 11, the values of capacitance recovery, real-capacitance recovery and tan δ in 120 Hz, and the value of ESR in 100 kHz were measured. The results are shown in Table 3. Also, changes in capacitance recovery and tan δ at 120 Hz and ESR at 100 kHz were evaluated by performing thermal aging on these solid electrolytic capacitors in the atmosphere at 150 degrees centigrade for 136 hours. The results are shown in Table 4.

TABLE 3

|  | CR (μF) | Real-CR (%) | tan δ | ESR (mΩ) |
|---|---|---|---|---|
| Example 9 | 477 | 82 | 0.044 | 2.0 |
| Example 10 | 478 | 82 | 0.045 | 3.0 |
| Example 11 | 481 | 83 | 0.062 | 4.1 |

TABLE 4

|  | ΔCR (%) | Δtanδ (%) | ΔESR (%) |
|---|---|---|---|
| Example 9 | 86 | 112 | 101 |
| Example 10 | 86 | 104 | 118 |
| Example 11 | 87 | 143 | 128 |

Table 3 shows that the value of ESR is increased as the amount of ethanol contained in the solvent in the polymerization solution is increased. This is considered to reflect the fact that the density of the polymer layer is lowered as the amount of ethanol is increased.

Also, Table 4 shows that the values of tan δ and ESR in the capacitor are increased as the amount of ethanol contained in the solvent in the polymerization solution is increased.

From these results, it was decided that the amount of water contained in the water-rich solvent should be 80% by mass or more, and that the greater the amount of water the better.

(B) Conductive Polymer Film/Polymer Electrode
(1) Influence of Supporting Electrolytes (a) Production Example 12

A solution was obtained by introducing 50 mL of distilled water into a glass container, adding 0.105 g (concentration; 0.0148 M) of EDOT to this solution and stirring it at 25 degrees centigrade for 60 minutes. The total amount of EDOT was dissolved in water. Then, ammonium borodisalicylate at the concentration of 0.08 M was dissolved in this solution to obtain a polymerization solution. An ITO electrode with an area of 1 $cm^2$ as a working electrode, a platinum mesh with an area of 4 $cm^2$ as a counter electrode, and a silver-silver chloride electrode as a reference electrode were introduced to the polymerization solution obtained, and galvanostatic electrolytic polymerization was performed for 60 seconds under a current condition of 10 $\mu A/cm^2$. The working electrode after electrolytic polymerization was washed with methanol, and then dried at 150 degrees centigrade for 30 minutes, and a transparent PEDOT conductive film on glass for use as a polymer electrode was obtained.

Example 13

The procedure of Example 12 was repeated, except that sodium bis(pentafluoroethanesulfonyl)imide was used instead of ammonium borodisalicylate.

Example 14

A solution was obtained by introducing 50 mL of distilled water into a glass container, adding 0.14 g (concentration; 0.02 M) of EDOT to this solution. EDOT and water were phase-separated. When ultrasonic waves of 20 kHz frequency and 2.6 w/$cm^2$ output were radiated into this solution for 5 minutes, an emulsion in which EDOT was dispersed in water as oil drops was obtained. The size of the EDOT oil drops of this solution were measured by a dynamic light scattering method at 25 degrees centigrade. The number average size of the oil drops was 214 nm. An ITO electrode with an area of 1 $cm^2$ as a working electrode, a platinum mesh with an area of 4 $cm^2$ as a counter electrode, and a silver-silver chloride electrode as a reference electrode were introduced to the polymerization solution obtained, and galvanostatic electrolytic polymerization was performed for 60 seconds under a current condition of 10 $\mu A/cm^2$. The working electrode after electrolytic polymerization was washed with methanol, and then dried at 150 degrees centigrade for 30 minutes, and a transparent PEDOT conductive film on glass was obtained.

Example 15

The procedure of Example 12 was repeated except that galvanostatic electrolytic polymerization was performed for 60 seconds under a current condition of 100 $\mu A/cm^2$.

Example 16

The procedure of Example 13 was repeated except that galvanostatic electrolytic polymerization was performed for 60 seconds under a current condition of 100 $\mu A/cm^2$.

Example 17

The procedure of Example 14 was repeated except that galvanostatic electrolytic polymerization was performed for 60 seconds under a current condition of 100 $\mu A/cm^2$.

Comparative Example 7

A polymerization solution was obtained by introducing 50 mL of distilled water into a glass container, adding 0.14 g (concentration; 0.02 M) of EDOT and 1.08 g ((concentration; 0.08 M) of sodium butylnaphthalenesulfonate as a supporting electrolyte having a sulfonic acid salt group to this solution, and stirring at 25 degrees centigrade for 60 minutes. An ITO electrode with an area of 1 $cm^2$ as a working electrode, a platinum mesh with an area of 4 $cm^2$ as a counter electrode, and a silver-silver chloride electrode as a reference electrode were introduced to the polymerization solution obtained, and galvanostatic electrolytic polymerization was performed for 60 seconds under a current condition of 10 $\mu A/cm^2$. The working electrode after electrolytic polymerization was washed with methanol, and then dried at 150 degrees centigrade for 30 minutes, and a transparent PEDOT conductive film on glass was obtained.

Comparative Example 8

100 μL of a commercially available dispersion (Baytron P, manufactured by H. C. Starck) containing a complex of PEDOT and polystyrene sulfonic acid (PSS) was cast on an ITO electrode with an area of 1 $cm^2$ and spin coating was carried out at the rotation frequency of 5000 rpm for 30 seconds. Then, the electrode was dried at 150 degrees centigrade for 30 minutes and a transparent PEDOT conductive film on glass was obtained.

Comparative Example 9

The procedure of Example 12 was repeated, except that sodium p-toluenesulfonate was used instead of ammonium borodisalicylate.

Comparative Example 10

The procedure of Example 12 was repeated, except that citric acid was used instead of ammonium borodisalicylate.

Comparative Example 11

The procedure of Example 12 was repeated, except that potassium nitrate was used instead of ammonium borodisalicylate.

Comparative Example 12

The procedure of Example 12 was repeated, except that lithium perchlorate was used instead of ammonium borodisalicylate.

(b) Characteristic Evaluation

Electrochemical activity of the transparent PEDOT conductive films on glass of Examples 12 to 17 and Comparative Examples 7 to 12 was evaluated by cyclic voltammogram. Each one of the transparent PEDOT conductive films on glass of Examples 12 to 17 and Comparative Examples 7 to 12 as a working electrode, a platinum mesh with an area of 4 cm$^2$ as a counter electrode, and a silver-silver chloride electrode as a reference electrode were introduced in an electrolytic solution in which 1 M of sodium sulfate was dissolved in water, and the cyclic voltammogram was evaluated with a scanning potential range of −0.5 V to +0.5 V, with a scanning rate of 10 mV/s. For the transparent PEDOT conductive films on glass of Comparative Examples 9 and 10, a stable cyclic voltammogram could not be obtained, and degradation of these PEDOT conductive films was found.

Then, the transparent PEDOT conductive films on glass of Examples 12 to 17 and Comparative Examples 7, 8, 11, and 12 were taken out of the electrolytic solution, and after washing, thermal aging were performed in the atmosphere at 150 degrees centigrade for 330 hours. After the ageing, the electrochemical activity was evaluated again by cyclic voltammogram.

FIGS. 1 to 7 show the cyclic voltammograms before and after the thermal aging. FIG. 1, FIG. 2, FIG. 3, FIG. 4, FIG. 5, FIG. 6 and FIG. 7 show cyclic voltammograms of the transparent PEDOT conductive films on glass of, respectively, Example 12 (where ammonium borodisalicylate is used), Example 13 (where sodium bis(pentafluoroethanesulfonyl)imide is used), Example 14 (where ammonium borodisalicylate is used and a polymerization solution through which ultrasonic waves are irradiated), Comparative Example 7 (where sodium butylnaphthalenesulfonate is used), Comparative Example 8 (where sodium polystyrenesulfonate is used), Comparative Example 11 (where potassium nitrate is used) and Comparative Example 12 (where Lithium perchlorate is used). In the figures, (A) shows the early-stage cyclic voltammograms and (B) shows the cyclic voltammograms after thermal aging.

Referring to the early-stage cyclic voltammograms, it can be observed that the transparent PEDOT conductive films on glass of Examples 12 to 14 and Comparative Examples 7, 11 and 12 show sufficient current response within the potential range of −0.5 V to +0.5 V and have excellent electrochemical activity, while the transparent PEDOT conductive film on glass in Comparative Example 8 has remarkably small current response and has small electrochemical activity. Also, referring to the cyclic voltammograms before and after thermal aging, it can be observed that the transparent PEDOT conductive films on glass of Examples 12 to 14 show a remarkably smaller decrease of current response after thermal aging compared with the transparent PEDOT conductive films on glass of Comparative Examples 7, 8, 11, and 12.

The conductive film of Comparative Example 7 (dopant: butylnaphthalenesulfonate ion) and the conductive film of Comparative Example 8 (dopant: polystyrenesulfonate ion) showed a smaller decrease of current response by thermal aging compared with the conductive films of Comparative Examples 11 and 12. This is considered to reflect the fact that the bulkiness of the dopant inhibited de-doping and heat resistance was improved (see Patent Document 4). However, the conductive films of Examples 12 to 14 had even more excellent heat resistance than the conductive films of Comparative Example 7 and 8. Especially, the conductive film of Example 13, which was obtained from the polymerization solution including sodium bis(pentafluoroethanesulfonyl)imide as a supporting electrode, showed remarkably excellent heat stability.

Figure 1:
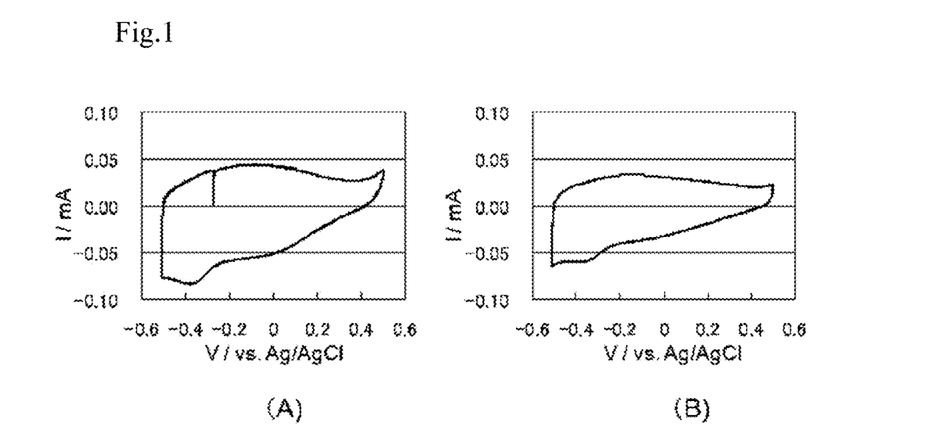
FIG. 1 shows a cyclic voltammogram of a transparent PEDOT conductive film on glass obtained from a polymerization solution containing ammonium borodisalicylate and EDOT at the saturated solution amount or less; (A) shows an early-stage cyclic voltammogram, and (B) shows a cyclic voltammogram after a heat aging test.
Figure 2:
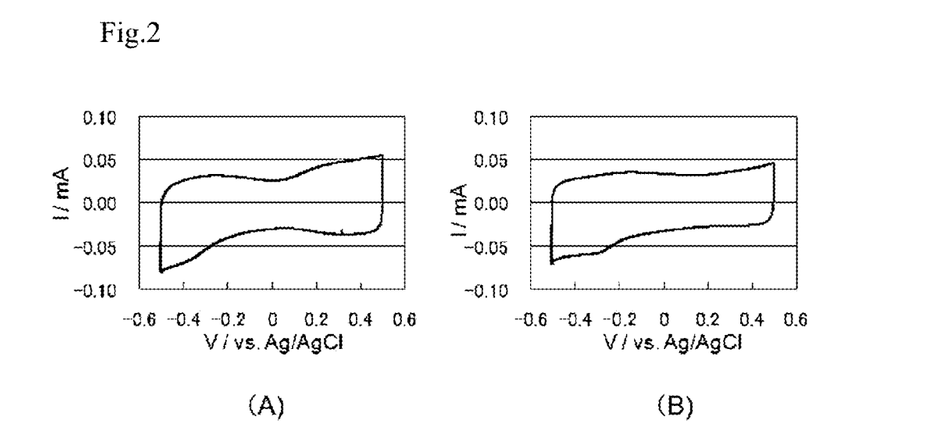
FIG. 2 shows a cyclic voltammogram of a transparent PEDOT conductive film on glass obtained from a polymerization solution containing sodium bis(pentafluoroethanesulfonyl)imide as a supporting electrolyte and EDOT at the saturated solution amount or less; (A) shows an early-stage cyclic voltammogram, and (B) shows a cyclic voltammogram after a heat aging test.
Figure 3:
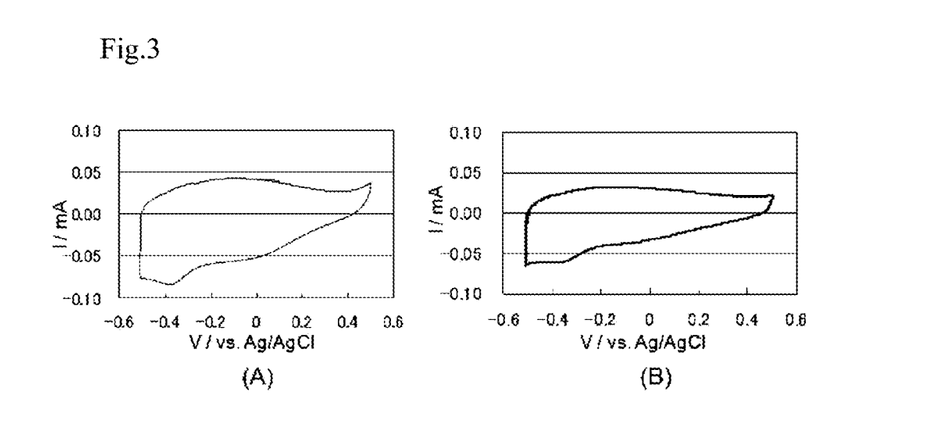
FIG. 3 shows a cyclic voltammogram of a transparent PEDOT conductive film on glass obtained from a polymerization solution containing ammonium borodisalicylate as a supporting electrolyte and EDOT at more than the saturated solution amount; (A) shows an early-stage cyclic voltammogram, and (B) shows a cyclic voltammogram after a heat aging test.
Figure 4:
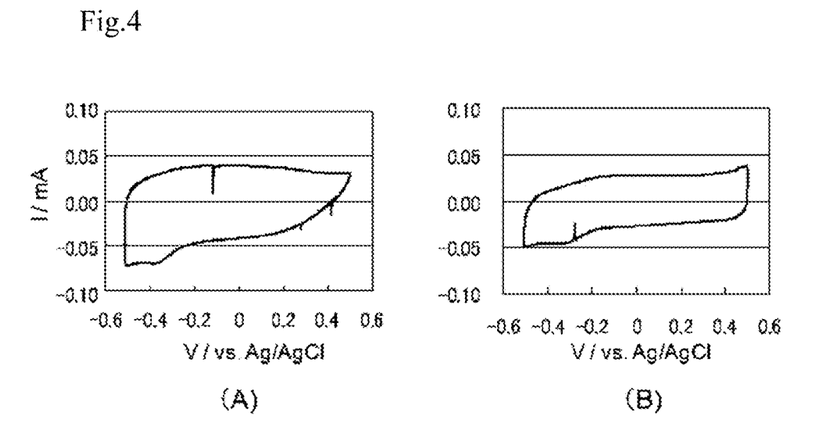
FIG. 4 shows a cyclic voltammogram of a transparent PEDOT conductive film on glass obtained from a polymerization solution containing sodium butylnaphthalenesulfonate as a supporting electrolyte and EDOT at the saturated solution amount or less; (A) shows an early-stage cyclic voltammogram, and (B) shows a cyclic voltammogram after a heat aging test.
Figure 5:
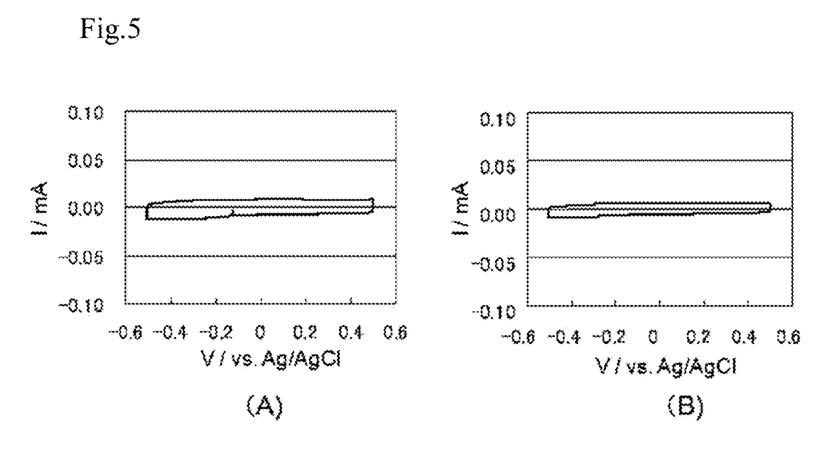
FIG. 5 shows a cyclic voltammogram of a transparent PEDOT conductive film on glass obtained from a slurry containing PEDOT and polystyrene sulfonic acid; (A) shows an early-stage cyclic voltammogram, and (B) shows a cyclic voltammogram after a heat aging test.
Figure 6:
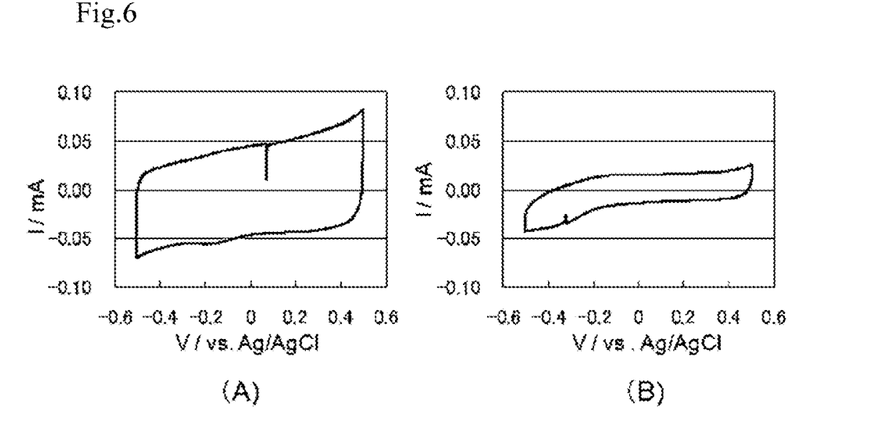
FIG. 6 shows a cyclic voltammogram of a transparent PEDOT conductive film on glass obtained from a polymerization solution containing potassium nitrate as a supporting electrolyte and EDOT at the saturated solution amount or less; (A) shows an early-stage cyclic voltammogram, and (B) shows a cyclic voltammogram after a heat aging test.
Figure 7:
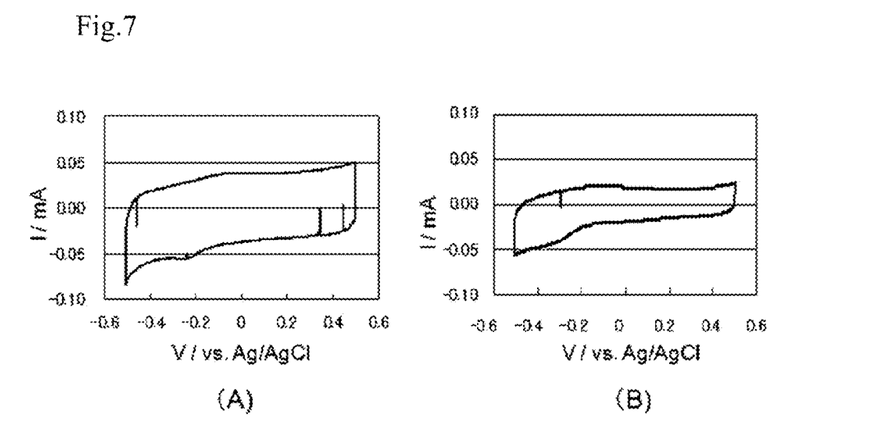
FIG. 7 shows a cyclic voltammogram of a transparent PEDOT conductive film on glass obtained from a polymerization solution containing lithium perchlorate as a supporting electrolyte and EDOT at the saturated solution amount or less; (A) shows an early-stage cyclic voltammogram, and (B) shows a cyclic voltammogram after a heat aging test.

Therefore, it was found that a conductive polymer film/polymer electrode of the present invention had excellent electrochemical activity and excellent heat resistance. Moreover, the transparent PEDOT conductive film on glass of Example 12 showed almost the same cyclic voltammogram result as the transparent PEDOT conductive film on glass of Example 14, and it was found that that regardless of whether EDOT in a polymerization solution was less than a saturated amount of dissolution or exceeded the saturated amount, a conductive polymer film/polymer electrode that has an equal excellent heat resistance was obtained. Further, the transparent PEDOT conductive film on glass of Example 12 and the transparent PEDOT conductive film on glass of Example 15 showed equivalent characteristics, the transparent PEDOT conductive film on glass of Example 13 and the transparent PEDOT conductive film on glass of Example 16 showed equivalent characteristics, and the transparent PEDOT conductive film on glass of Example 14 and the transparent PEDOT conductive film on glass of Example 17 showed equivalent characteristics.

(2) Influence of Organic Solvents (a) Production

Example 18

A solution was obtained by introducing 50 mL of distilled water into a glass container, adding 0.105 g (concentration; 0.0148 M) of EDOT to this solution and stirring it at 25 degrees centigrade for 60 minutes. The total amount of EDOT was dissolved in water. Then, ammonium borodisalicylate at the concentration of 0.08 M was dissolved in this solution to obtain a polymerization solution. An ITO electrode with an area of 1 cm$^2$ as a working electrode, a platinum mesh with an area of 4 cm$^2$ as a counter electrode, and a silver-silver chloride electrode as a reference electrode were introduced to the polymerization solution obtained, and galvanostatic electrolytic polymerization was performed for 10 minutes under a current condition of 100 µA/cm$^2$. The working electrode after electrolytic polymerization was washed with methanol, and then dried at 150 degrees centigrade for 30 minutes, and a transparent PEDOT conductive film on glass for use as a polymer electrode was obtained.

Example 19

A solution was obtained by introducing 50 mL of a mixed solvent of distilled water and ethanol at the mass ratio of 95:5 into a glass container, adding 0.105 g (concentration; 0.0148 M) of EDOT to this solution and stirring it at 25 degrees centigrade for 60 minutes. The total amount of EDOT was dissolved in water. Then, ammonium borodisalicylate at the concentration of 0.08 M was dissolved in this solution to obtain a polymerization solution. An ITO electrode with an area of 1 cm$^2$ as a working electrode, a platinum mesh with an area of 4 cm$^2$ as a counter electrode, and a silver-silver chloride electrode as a reference electrode were introduced to the polymerization solution obtained, and galvanostatic electrolytic polymerization was performed for 10 minutes under a current condition of 100 μA/cm$^2$. The working electrode after electrolytic polymerization was washed with methanol, and then dried at 150 degrees centigrade for 30 minutes, and a transparent PEDOT conductive film on glass for use as a polymer electrode was obtained.

Example 20

A solution was obtained by introducing 50 mL of a mixed solvent of distilled water and ethanol at the mass ratio of 80:20 into a glass container, adding 0.105 g (concentration; 0.0148 M) of EDOT to this solution and stirring it at 25 degrees centigrade for 60 minutes. The total amount of EDOT was dissolved in water. Then, ammonium borodisalicylate at the concentration of 0.08 M was dissolved in this solution to obtain a polymerization solution. An ITO electrode with an area of 1 cm$^2$ as a working electrode, a platinum mesh with an area of 4 cm$^2$ as a counter electrode, and a silver-silver chloride electrode as a reference electrode were introduced to the polymerization solution obtained, and galvanostatic electrolytic polymerization was performed for 10 minutes under a current condition of 100 μA/cm$^2$. The working electrode after electrolytic polymerization was washed with methanol, and then dried at 150 degrees centigrade for 30 minutes, and a transparent PEDOT conductive film on glass for use as a polymer electrode was obtained.

(b) Characteristic Evaluation

Figure 8:
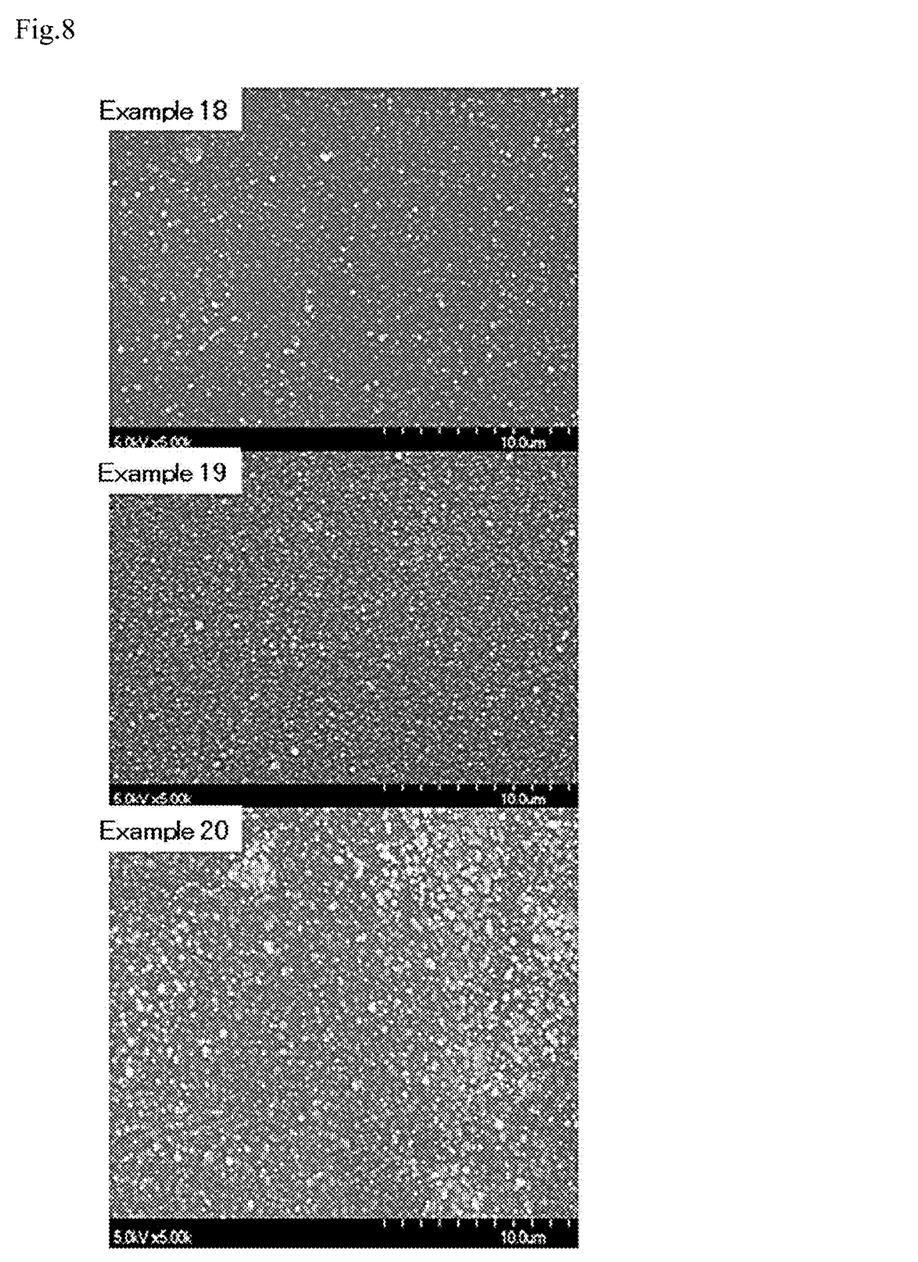
FIG. 8 shows SEM images of transparent PEDOT conductive films on glass.

The conductive films of Examples 18 to 20 were observed in SEM images. FIG. 8 shows the SEM images at 5000× magnification. As is obvious from these SEM images, as the amount of ethanol contained in the solvent in the polymerization solution increased, the polymer particles of the conductive films became coarse and the density of the conductive films was reduced. It is considered that this leads to the lower heat resistance of the conductive films.

INDUSTRIAL APPLICABILITY

A conductive polymer obtained from a polymerization solution of the present invention can be applied in a wide range of fields such as solid electrolytic capacitors, polymer batteries, antistatic films, indicating elements, sensors and electrode materials.

What is claimed is:
1. A polymerization solution for electrolytic polymerization of 3,4-disubstituted thiophene, comprising:
   a solvent consisting of 100 to 80% by mass of water and 0 to 20% by mass of an organic solvent;
   at least one monomer selected from the group consisting of 3,4-disubstituted thiophenes; and
   at least one organic non-sulfonate supporting electrolyte having an anion with the molecular weight of 200 or more,
   wherein the supporting electrolyte is at least one compound selected from the group consisting of borodisalicylic acid and borodisalicylic salts.
2. The polymerization solution according to claim 1, wherein the solvent consists only of water.
3. The polymerization solution according to claim 1, wherein the monomer is 3,4-ethylenedioxythiophene.
4. The polymerization solution according to claim 1, wherein the monomer is dispersed as oil drops in the polymerization solution.
5. A conductive polymer film obtained by introducing a substrate with a conductive part at least on the surface in the polymerization solution according to claim 1 and then performing electrolytic polymerization.
6. A polymer electrode comprising:
   a substrate with a conductive part at least on the surface; and
   a conductive polymer film layered on the conductive part of the substrate, wherein the conductive polymer film is obtained by introducing the substrate in the polymerization solution according to claim 1 and then performing electrolytic polymerization.
7. A solid electrolytic capacitor comprising:
   a positive electrode made of valve metal foil with an oxide film on the surface; and
   a conductive polymer layer on the positive electrode, wherein the conductive polymer layer is formed by introducing the positive electrode in the polymerization solution according to claim 1 and then performing electrolytic polymerization.
8. A solid electrolytic capacitor comprising:
   a positive electrode made of valve metal foil with an oxide film on the surface;
   a negative electrode made of valve metal foil; and
   a separator retaining a conductive polymer layer between the positive electrode and the negative electrode, wherein the conductive polymer layer is formed by introducing in the polymerization solution according to claim 1 a capacitor element comprising the positive electrode, the negative electrode and a separator therebetween, impregnating the polymerization solution in the capacitor element and then performing electrolytic polymerization.
9. A conductive polymer film obtained by introducing a substrate with a conductive part at least on the surface in the polymerization solution according to claim 2 and then performing electrolytic polymerization.
10. A solid electrolytic capacitor comprising:
   a positive electrode made of valve metal foil with an oxide film on the surface; and
   a conductive polymer layer on the positive electrode, wherein the conductive polymer layer is formed by introducing the positive electrode in the polymerization solution according to claim 2 and then performing electrolytic polymerization.
11. A solid electrolytic capacitor comprising:
   a positive electrode made of valve metal foil with an oxide film on the surface;
   a negative electrode made of valve metal foil; and
   a separator retaining a conductive polymer layer between the positive electrode and the negative electrode, wherein the conductive polymer layer is formed by introducing in the polymerization solution according to claim 2 a capacitor element comprising the positive electrode, the negative electrode and a separator ther- ebetween, impregnating the polymerization solution in the capacitor element and then performing electrolytic polymerization.

12. A conductive polymer film obtained by introducing a substrate with a conductive part at least on the surface in the polymerization solution according to claim 3 and then performing electrolytic polymerization.

13. A solid electrolytic capacitor comprising:
a positive electrode made of valve metal foil with an oxide film on the surface; and
a conductive polymer layer on the positive electrode, wherein the conductive polymer layer is formed by introducing the positive electrode in the polymerization solution according to claim 3 and then performing electrolytic polymerization.

14. A solid electrolytic capacitor comprising:
a positive electrode made of valve metal foil with an oxide film on the surface;
a negative electrode made of valve metal foil; and
a separator retaining a conductive polymer layer between the positive electrode and the negative electrode, wherein the conductive polymer layer is formed by introducing in the polymerization solution according to claim 3 a capacitor element comprising the positive electrode, the negative electrode and a separator therebetween, impregnating the polymerization solution in the capacitor element and then performing electrolytic polymerization.

15. A polymer electrode comprising:
a substrate with a conductive part at least on the surface; and
a conductive polymer film layered on the conductive part of the substrate, wherein the conductive polymer film is obtained by introducing the substrate in the polymerization solution according to claim 2 and then performing electrolytic polymerization.

16. A polymer electrode comprising:
a substrate with a conductive part at least on the surface; and
a conductive polymer film layered on the conductive part of the substrate, wherein the conductive polymer film is obtained by introducing the substrate in the polymerization solution according to claim 3 and then performing electrolytic polymerization.

* * * * *